United States Patent
VanEs et al.

(10) Patent No.: US 9,512,297 B2
(45) Date of Patent: Dec. 6, 2016

(54) STABILIZED FLEXIBLE PVC COMPOSITIONS AND ARTICLES MADE THEREFROM

(71) Applicants: STICHTING DIENST LANDBOUWKUNDIG ONDERZOEK, Wageningen (NL); ARCHER DANIELS MIDLAND COMANPY, Decatur, IL (US)

(72) Inventors: Daniel Stephen VanEs, Wageningen (NL); Jacobus VanHaveren, Wageningen (NL); Augustinus Emmanuel Frissen, Wageningen (NL); Johannes Cornelis VandeKolk, Wageningen (NL)

(73) Assignees: Washington State University, Pullman, WA (US); Archer Daniels Midland Company, Decatur, IL (US)

( * ) Notice: Subject to any disclaimer, the term of this patent is extended or adjusted under 35 U.S.C. 154(b) by 0 days.

(21) Appl. No.: 14/400,814

(22) PCT Filed: Jun. 4, 2013

(86) PCT No.: PCT/US2013/044078
§ 371 (c)(1),
(2) Date: Nov. 13, 2014

(87) PCT Pub. No.: WO2013/184661
PCT Pub. Date: Dec. 12, 2013

(65) Prior Publication Data
US 2015/0183954 A1    Jul. 2, 2015

Related U.S. Application Data

(60) Provisional application No. 61/655,026, filed on Jun. 4, 2012.

(51) Int. Cl.
C08K 5/1535 (2006.01)
C08J 5/18 (2006.01)
C08K 5/00 (2006.01)

(52) U.S. Cl.
CPC ............... *C08K 5/1535* (2013.01); *C08J 5/18* (2013.01); *C08J 2327/06* (2013.01); *C08K 5/0016* (2013.01)

(58) Field of Classification Search
CPC ................................................... C08K 5/1535
See application file for complete search history.

(56) References Cited

U.S. PATENT DOCUMENTS

2012/0220507 A1* 8/2012 Grass ................ C07D 307/68
508/309

* cited by examiner

*Primary Examiner* — Robert Harlan
(74) *Attorney, Agent, or Firm* — William B. Miller (57) ABSTRACT

Plasticized, unpigmented and pigmented PVC films are described which utilize a biobased, phthalate ester alternative primary plasticizer. The films show comparable color performance to the phthalate ester-plasticized unpigmented or pigmented PVC films, even where the neat biobased plasticizer has a much higher Pt—Co color as measured according to DIN-6271 (ASTM D 1209) compared to the neat phthalate ester plasticizer. Biobased primary plasticizers in the form of diesters of furan-2,5-dicarboxylic acid are especially contemplated, and provide increased thermal stability to the PVC films as an added benefit.

15 Claims, 2 Drawing Sheets

STABILIZED FLEXIBLE PVC COMPOSITIONS AND ARTICLES MADE THEREFROM

BACKGROUND

The present invention is concerned with plasticized polyvinyl chloride (PVC) compositions and articles made therefrom, and more particularly concerns those PVC compositions containing one or more materials which have been added to the compositions as thermal stabilizers.

PVC is a common commodity plastic, with global production exceeded only by polyethylene and polypropylene. It is cost-effective, highly versatile and is used in many applications in rigid, semi-flexible and flexible form. Rigid PVC is often used for ductwork, piping and the like, for example, in water, sewage and drainage piping, where chemical resistance is needed but not flexibility or pliability. Plasticized PVC, on the other hand, finds application in films, sheeting, wire and cable coverings, moldings, conveyor belting, toys and hose, in addition to serving as a leather substitute and as a fabric covering for upholstered furniture, automotive seating and other articles.

Broadly speaking, plasticizers are materials which are combined with polymers such as polyvinyl chloride (hereinafter, PVC) to impart flexibility, extensibility and workability or some combination of these attributes to the polymer, as needed for a particular end use. Frequently, a combination of primary and secondary plasticizers is used, with the secondary plasticizers not acting in and of themselves to impart the desired attributes to the PVC but serving to improve the effectiveness of the primary plasticizer(s) and optionally offering other characteristics to a PVC composition in which the materials are incorporated.

Historically, the majority of primary PVC plasticizers have been petroleum-derived phthalates and benzoate compounds, dioctyl phthalate and diisononyl phthalate being notable examples. However, such petroleum-derived plasticizers are frequently expensive to produce and use because of fluctuations in the pricing and availability of petroleum, and are increasingly likely to remain so as petroleum reserves are reduced and new supplies prove more costly and difficult to secure. Further, certain of the petroleum-derived phthalate plasticizers have raised concerns for their potential to disrupt human endocrine activity, and regulatory controls have been established in a number of countries to address these concerns.

As a consequence, efforts have been made in recent years by a number of parties to develop biobased phthalate replacement plasticizers. Unmodified plant/vegetable oils are largely incompatible with PVC resin, but certain modified derivatives of such oils, such as epoxidized soybean oil (ESO), are compatible with PVC resin and have been actively investigated for use as a lower cost, renewable source-based alternative to the petroleum-based plasticizers, both as primary and secondary plasticizers.

Carbohydrate-based alternatives have also been investigated. Carbohydrates represent a well-known, abundant class of natural raw materials, but generally have been too reactive/unstable to be used directly in many industrial chemical processes as renewable alternative feeds because of the presence of large numbers of hydroxyl and/or keto functionalities. Consequently, derivatives of carbohydrates with reduced functionality and improved stability have been developed and investigated for a variety of uses, including for use as plasticizers for PVC or as a feedstock useful for making materials useful as plasticizers. An example is the Polysorb® ID 37 isosorbide diester plasticizer product being offered by Roquette Freres as a suitable biobased phthalate replacement plasticizer.

One of the carbohydrate-derived materials considered for use in making a biobased, phthalate alternative plasticizer for PVC is furan-2,5-dicarboxylic acid, more commonly referred to in the literature as FDCA. FDCA has been looked at primarily as a biobased alternative for terephthalic acid, which is currently produced on a multimillion ton scale from petrochemical feedstocks, but with FDCA's structural similarity to phthalates in general some work has been done also to evaluate the FDCA diesters as potential phthalate replacements in flexible PVC compositions.

The earliest publication known to Applicants describing the use of FDCA-based diesters as plasticizers for PVC is a 1994 paper by Sanderson et al. (Sanderson et al., "Synthesis and Evaluation of Dialkyl Furan-2,5-Dicarboxylates as Plasticizers for PVC", Journal of Applied Polymer Science, vol. 53, pp 1785-1793 (1994)), wherein the synthesis of the 2-ethylhexyl, 2-octyl, n-hexyl, n-butyl esters from furfural was initially accomplished via a six-step synthesis. The desired FDCA diesters were then made by transesterification of the dimethyl ester of FDCA. Small samples of plasticized PVC were obtained by compression molding of PVC/plasticizer blends, and subsequently analyzed by dynamic mechanical thermal analysis (DMTA). The performance of the FDCA diesters as plasticizers was compared to that of di-2-ethylhexyl phthalate (DEHP, also known as DOP). While the plasticizing performance of the 2-octyl-FDCA ester was very similar to the results seen with the known phthalate plasticizer, and while improvements in compatibility were noted, the authors did observe discoloration of the FDCA diester-plasticized PVC compositions over time on exposure to light and air.

More recently, Grass et al, in published applications WO 2011/023491 and WO 2011/023590, described the synthesis and plasticizing performance of FDCA diesters from isononyl and isodecyl alcohols. Both diesters were found to have beneficial properties and advantages compared to the corresponding phthalate esters, and are described as useful alone or in combination with other plasticizers in "plastics compositions, adhesives, sealants, lacquers, paints, plastisols, artificial leathers, floor coverings, floor coverings, underbody coatings, coated fabrics, wallpapers, or inks", as well as "in profiles, seals, food packages, films, toys, medicinal items, roofing materials . . . cables, and wire coatings . . . food packaging . . . bags and tubing materials for infusions, dialysis, and drainage." Surprisingly, however, while the earlier work by Sanderson et al. is expressly acknowledged, neither of these applications mentions the discoloration observed by Sanderson et al, describes the presence or absence of color in the plasticized PVC compositions made or in the articles produced therefrom, or undertakes or reports any measurements related to color.

SUMMARY OF THE INVENTION

Against this background, the present work considers in one aspect the discoloration observed by Sanderson et al with respect to the suitability of FDCA diesters, such as taught by Sanderson et al and Grass et al, for providing a commercially acceptable phthalate ester replacement in plasticizing PVC and making plasticized PVC articles of commerce.

Preliminarily, despite Grass et al.'s silence in the matter, it must be acknowledged that color—or, more precisely, the absence of color—is a critical parameter for many flexible PVC applications. In a number of common applications or contexts of use, plasticized PVC compositions are desirably both colorless and clear in a completed, finished article form. An example would be in the making of clear plastic tubing for medical and other uses. In a great many other applications, where a pigmented composition is used (and the desired end color is other than black), a low color flexible PVC composition apart from the pigment is likewise needed to enable the desired, true colors to be achieved. Examples would include toys, automotive interior and exterior trim, textile inks, vinyl flooring (which requires a non-yellow wear layer and clean whites underneath) and myriad other consumer and industrial goods where color is an important differentiator and marketing tool.

Thus, in one aspect, an objective was to enable FDCA diester plasticizers to be used as primary plasticizers in flexible PVC compositions, wherein the color performance of these PVC compositions would be such that the FDCA diesters could be considered commercially acceptable, biobased replacements for the phthalate ester primary plasticizers in at least this respect.

The present invention succeeds in this objective, and in one aspect provides a plasticized, unpigmented PVC film having CIELAB color values as measured according to DIN-6174 (ASTM E-308) which compare to those demonstrated in a corresponding phthalate ester-plasticized flexible PVC film, even where the neat primary plasticizer used for making the film demonstrates a Pt—Co color of at least about 500 as measured according to DIN-6271 (ASTM D 1209)—or at least about 25 times the Pt—Co color of the neat conventional phthalate ester plasticizer.

In a related aspect, plasticized, pigmented PVC films are provided wherein a comparable fidelity to a reference color standard is realized with a biobased phthalate ester replacement primary plasticizer as compared to a corresponding phthalate ester, even where the neat primary plasticizer used for making the film demonstrates a Pt—Co color of at least about 500 as measured according to DIN-6271—or at least about 25 times the Pt—Co color of the neat conventional phthalate ester plasticizer.

In another aspect, FDCA diester-plasticized PVC compositions are provided which are able to utilize reduced stabilizer loadings compared to those that would be required to provide the same thermal stability in a comparable phthalate ester-plasticized PVC composition.

In still another aspect, a method is provided for reducing the cost of manufacturing a stabilized flexible PVC composition and of articles made therefrom characterized by a given degree of thermal stability, wherein the amount of one or more stabilizers employed is reduced by incorporating one or more FDCA diesters in the composition.

In yet another aspect, reduced stabilizer loading flexible PVC compositions are provided, together with articles made therefrom.

It will be understood, parenthetically, in reciting these various aspects that a simplified summary only of the invention has been presented, in order to provide a basic understanding of some of its aspects. This summary is not intended as an extensive overview of the invention, nor is it intended for identifying key or critical elements of the invention or for delineating the scope of what has been invented, as what has been invented is reflected in the claims below. The sole purpose of this summary is to present some concepts of the invention in a simplified form as a prelude to the more detailed description that follows.

DETAILED DESCRIPTION OF PREFERRED EMBODIMENTS

As briefly summarized above, the present invention relates in a first aspect to a plasticized, unpigmented PVC film having CIELAB color values as measured according to DIN-6174 which compare to those demonstrated in a corresponding phthalate ester-plasticized flexible PVC film.

Briefly, as will be evident from the examples below, we found that despite profound differences in the colors of the FDCA diester and the analogous phthalate ester plasticizers as measured according to DIN-ISO 6271 (Pt—Co scale)—differences which substantially persisted even after extended storage (6 weeks) under ambient conditions—nevertheless surprisingly FDCA diester-plasticized films could be prepared which exhibited roughly equivalent color performance to sample articles made from the same conventional phthalate ester-plasticized PVC compositions, when color measurements were made according to the CIELAB system (DIN-6174).

More particularly, in the context of plasticized unpigmented films, such films were prepared wherein the a* and b* color values according to the CIELAB color model were not more than about 3 units removed from a value of 0 when measured according to DIN-6174, even where the FDCA diester primary plasticizer in neat form had been determined to have a Pt—Co Hazen color of 500 and greater according to DIN-6271. Preferably, films will have neither of the a* or b* color values more than about 2 units removed from 0, even while using a primary plasticizer having a Pt—Co Hazen color of more than about 400.

Considered from a somewhat different perspective, the plasticized unpigmented PVC films enabled by the present invention have a* and b* CIELAB color values no more than about 250 percent, and more preferably no more than about 200 percent further removed from a value of 0 than the a* and b* CIELAB color values of a reference plasticized unpigmented PVC film made in substantially the same way but for the use of a different primary plasticizer, even where the neat primary plasticizer used in the inventive films has a Pt—Co color according to DIN-6271 at least about 20 times, even greater than about 25 times greater than the Pt—Co color of the neat primary plasticizer used in the reference film.

In the context of plasticized pigmented films, the bioplasticized films of the present invention compare with films using the phthalate ester primary plasticizers in fidelity to a reference color standard, so that even where the neat primary bioplasticizer has a Pt—Co color of at least 200, preferably even when the neat primary bioplasticizer has a Pt—Co color of 500 and greater and even as much as 600 or greater, the variances in the a*, b* and L* color values between the inventive films and a reference color standard will be less than about 400 percent, preferably less than about 200 percent and more preferably less than about 100 percent.

More particularly, even using a primary plasticizer having a Pt—Co color (as the neat plasticizer) at least about 20 times, even at least about 25 times, the Pt—Co color of a corresponding phthalate ester primary plasticizer, plasticized pigmented films according to the present invention will exhibit variances in their a*, b* and L* color values that are no more than about 600 percent, especially no more than about 400 and particularly no more than about 200 percent greater than the variances exhibited from a reference standard with using a phthalate ester primary plasticizer.

That films could be prepared which exhibited roughly equivalent color performance to films made from the conventional phthalate ester-plasticized PVC compositions, using FDCA diester primary plasticizers having Pt—Co color values for the neat plasticizer that so greatly exceed the Pt—Co color values of the comparable phthalate ester plasticizers they seek to replace (for example, being ten-fold greater for the ethylhexyl furanoate versus the ethylhexyl phthalate material, and twenty-five times greater for the isodecyl furanoate versus the isodecyl phthalate) was unexpected. The effect is demonstrably not a pure dilution effect, as higher-color phthalate esters have not been observed to demonstrate the same behavior.

Conventionally, unpigmented PVC films experience a degree of discoloration over time due to degradation under different environmental conditions, consistent with Sanderson et al's observations as to the neat plasticizer. In fact, monitoring the extent of color development over time has been proposed as a more effective means for monitoring the degradation kinetics of flexible PVC films over time than the more commonly used method of monitoring weight loss using thermogravimetric analysis, see Krongauz et al., "Kinetics of Thermal Degradation of Poly(Vinyl Chloride) by Color", ANTEC 2011 (Society of Plastics Engineers, 2011). As well, some yellowing of PVC has been observed in certain storage environments by the interaction of NOx gases from gas heaters or propane forklifts with certain stabilizers in the PVC.

Against this background, it was observed that the FDCA diester-plasticized compositions behaved distinctively in a second aspect, as well, in that the FDCA diester plasticizers appeared to have an additive or a synergistic thermal stabilizing effect in addition to a plasticizing effect—thus appearing to function as both a plasticizer and a stabilizer in part. Without intending to be limiting of the present invention in this first aspect, of producing unpigmented and pigmented PVC films from high color primary plasticizers that nevertheless demonstrate commercially acceptable performance in terms of "whiteness" and fidelity to a color standard, respectively, with the tendency of the known phthalate ester-plasticized PVC films to discolor as they degrade it is presently postulated that the capacity of the FDCA diester plasticizers to provide an additional thermal stabilizing effect in this second aspect may in some fashion be directly related to the surprisingly reduced film color phenomenon discussed above and exemplified below—though because the precise mechanisms involved in thermal degradation and stabilization of PVC are themselves not thoroughly and commonly understood, the manner in which the FDCA diester-plasticized compositions in the examples below provided both the "reduced film color" and improved thermal stability benefits is not fully understood.

In regard to this second aspect in particular, poly(vinyl chloride) is one of the most widely used of commercial plastics, but it is well established that PVC is thermally unstable at elevated temperatures, so that absent the use of thermal stabilizers PVC is not industrially very useful. Unfortunately, a number of widely used thermal stabilizers for PVC incorporate toxic heavy metal and organo-tin compounds that pose fairly significant environmental concerns.

A recent survey of the PVC thermal stabilizer literature, Folarin et al., "Thermal Stabilizers for Poly(Vinyl Chloride): A Review", Journal of the Physical Sciences, vol. 6, no. 18, pp. 4323-4330 (September 2011), accordingly makes note of a number of efforts to develop organic and inorganic alternatives that variously function as primary and secondary stabilizers or as co-stabilizers, and that would more benign in their effects on the environment. Preferred additional characteristics of the stabilizers are identified as well, in that these more benign stabilizers would preferably be colorless, compatible, non-migrating, odorless, tasteless and preferably also relatively inexpensive.

These efforts approach the problem of thermal degradation from several directions, as despite the consensus around the need for alternative stabilizers, the survey indicates that the mechanism of thermal degradation of PVC as well as its causes are matters in controversy around which consensus is lacking. Various classes of organic compounds investigated for their capacity to replace labile chlorine atoms, scavenge chlorine radicals and HCl, add across polyene sequences and/or facilitate aromatic alkylation include the acids, phenols, esters, amines, thiols, polyols and some heterocyclic compounds. Inorganic materials mentioned include anion-exchanging clays or layered double hydroxide materials (such as hydrotalcite) and certain inorganic salts, e.g., calcium carbonate, cerium carbonate. The stabilizing effect of these inorganic compounds is attributed to their HCl scavenging ability, ability to replace labile chlorine atoms and an electrostatic interaction between the chlorine atoms of the polymer chain and the positive layer of the hydrotalcite, thereby weakening the ability of the chlorine atoms to initiate dehydrochlorination.

Figure 2:
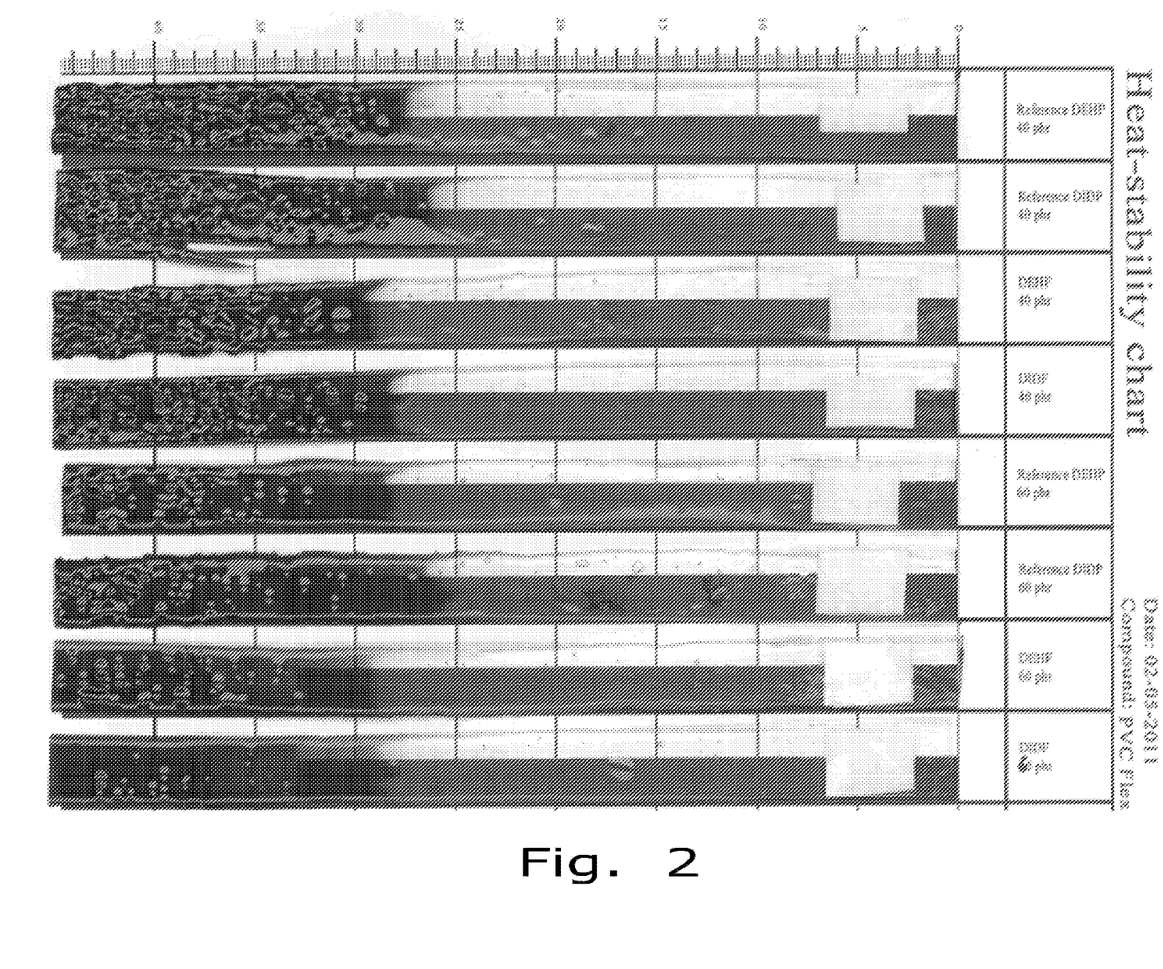
FIG. 2 shows the results of static heat stability testing conducted on films prepared from PVC compositions using the FDCA diesters or using the corresponding phthalate ester plasticizers.

The FDCA diesters, as mentioned, appear also to have one or more of the thermal stabilizing qualities attributed to the various, desirably "greener" stabilizer alternatives highlighted in the survey or to have an additive or synergistic effect with one or more stabilizers in the PVC compositions of the present invention, in addition to serving as an effective biobased plasticizer. Referring to FIG. 2, for example, comparing the strips at 60 phr for the diisodecyl furanoate and the corresponding diisodecyl phthalate, the onset of color from evolution of HCl occurred at just over 26 minutes for the phthalate ester-plasticized material compared to around 28.5 minutes for the furanoate ester-plasticized material. At 40 phr, for comparison, the onset of color appeared to occur very near 26 minutes for the phthalate ester-plasticized material, while the result for the furanoate ester-plasticized material was approximately 28 minutes. By comparison, the 60 phr strips for the diethyihexyl phthalate and furanoate ester materials were about 28 minutes and 29 minutes, respectively, while the 40 phr strips showed just over 27 minutes and again about 29 minutes for the phthalate and furanoate ester-plasticized materials. Correspondingly, the onset of offgassing was later for the furanoate ester-plasticized materials, and was less extensive when offgassing began as indicated by the numbers of bubbles generated in the strips. Generally, at 40 phr, the diethyhexyl and diisodecyl furanoate-plasticized materials showed a comparable degree of offgassing, while at 60 phr the diisodecyl furanoate-plasticized composition was noticeably improved compared to the diethyihexyl furanoate-plasticized composition. As well, the improvement over the phthalate ester-plasticized materials was pronounced at a 60 phr level, and particularly for the isodecyl esters.

Because of the improved thermal stability provided by the FDCA diesters, in addition to providing color performance on a par with the phthalate esters and while enabling a presumptively safer, biobased alternative to the phthalate esters, the FDCA diesters of the present invention also make possible flexible PVC compositions having reduced requirements/reduced loading of stabilizer materials as compared to those that would be required to provide the same thermal stability in the corresponding phthalate ester-plasticized PVC composition. One readily appreciated benefit of this discovery is that the cost of manufacturing a stabilized flexible PVC composition and of articles made therefrom having a given degree of thermal stability can be reduced by reducing the amount of one or more other stabilizers and incorporating one or more FDCA diesters in the composition.

The capacity to displace a portion of the stabilizer or stabilizer package with the FDCA diesters of the present invention may bring additional benefits, in terms of reduced plate-out and overall improved compatibility if less of the stabilizer is needed, reduced emissions of volatiles from liquid stabilizer formulations that might be used, for example. The amount of stabilizer that can be displaced by using the FDCA diesters rather than the corresponding phthalate ester plasticizers, for example, can be expected to vary somewhat dependent on what stabilizer or combination of stabilizers are present in the composition, but generally it is expected that overall stabilizer content exclusive of the FDCA diester plasticizers can be reduced by at least about 10 percent, more preferably being reduced by at least about 20 percent and most preferably being reduced by at least about 30 percent.

Examples of reduced stabilizer loading flexible PVC compositions according to the present invention include PVC with at least one or more FDCA diesters and one or more of the many known organic or inorganic materials with the capacity to improve the thermal stability of PVC. In this regard, any of the thermal stabilizers and/or thermal stabilizer combinations mentioned in Folarin et al., "Thermal Stabilizers for Poly(Vinyl Chloride): A Review", Journal of the Physical Sciences, vol. 6, no. 18, pp. 4323-4330 (September 2011) and in the various published studies referenced therein may generally be considered. Folarin mentions the industrially used lead salts, metal soaps and organotin compounds, as well as a number of more benign or less costly materials which had been evaluated or suggested as preferable alternatives to the lead salts, metal soaps and organotin compounds. For the PVC compositions contemplated by the present invention, of course, it will generally be preferable too to use more environmentally benign thermal stabilizers (for example, hydrotalcites), though the industrially more common but arguably less benign materials, for example, lead salts such as dibasic lead carbonate and dibasic lead stearate, dibasic lead phosphite and tribasic lead sulfate may also be used. Metal soaps such as mentioned by Folarin include calcium and zinc soaps of some seed oils, metal carboxylate salts, barium-cadmium stearate and barium-cadmium-zinc stearate materials, while organo-tin compounds include dibutyl tin maleate, dibutyltin laurate, di-n-octyltin mercaptide, and dimethyltin mercaptide. Other known thermal stabilizers which may be considered for use include the organic phosphites, for example, trioctyl, tridecyl, tridodecyl, tritridecyl, tripentadecyl, trioleyl, tristearyl, triphenyl, tricresyl, tris (nonylphenol), tris(2,4-tert-butylphenyl), tricyclohexyl, mixed aryl dialkyl or alkyl diaryl phosphites, and other organostabilizers such as dihydroxypyridines, uracil derivatives, beta-diketones, aminocrotonates, epoxides and polyols such as dipenta erythritol, sorbitol, diTMP and the like. Other conventional materials can be included in the PVC compositions, for example, fillers, biocides, pigments, blowing agents, other plasticizers in addition to the one or more FDCA diesters and lubricants, as desired for a particular application.

The two published applications of Grass et al, published international patent applications WO 2011/023491 and WO 2011/023590, are particularly concerned with the diesters of FDCA based on isononyl and isodecyl alcohols, but the compositions of the present invention can generally use any of the diesters of FDCA that can be prepared. Preferred diesters are those prepared from the normal and iso C3 to C14 alcohols. More preferred are those prepared from the normal and iso C5 to C11 alcohols.

WO 2009/076627 by Sanborn et al. provides an example of a solid acid-resin catalyzed method for making HMF, wherein substantially pure HMF, HMF esters or HMF ethers are indicated as produced from a carbohydrate source by contacting the carbohydrate source with a solid phase catalyst; "substantially pure" was defined as referencing a purity of HMF of about 70% or greater, optionally about 80% or greater, or about 90% or greater.

A method of producing HMF esters from a carbohydrate source and organic acids involved, in one embodiment, heating a carbohydrate starting material with a solvent in a column, and continuously flowing the heated carbohydrate and solvent through a solid phase catalyst in the presence of an organic acid to form a HMF ester. The solvent is removed by rotary evaporation to provide a substantially pure HMF ester. In another embodiment, a carbohydrate is heated with the organic acid and a solid catalyst in a solution to form an HMF ester. The resulting HMF ester may then be purified by filtration, evaporation, extraction, and distillation or any combination thereof.

United States patent applications filed as U.S. Ser. No. 61/584,900 on Jan. 10, 2012 for "Process for Making HMF and HMF Derivatives from Sugars, with Recovery of Unreacted Sugars Suitable for Direct Fermentation to Ethanol", and as U.S. Patent Application Ser. No. 61/619,976, filed Apr. 4, 2012 for "Process for Making Sugar and/or Sugar Alcohol Dehydration Products", both of which are incorporated herein by reference, describe preferred methods for carrying out the synthesis of HMF from carbohydrates that may be employed to provide HMF for being oxidized to FDCA.

In the former, a process is disclosed for making hydroxymethylfurfural from an aqueous hexose sugar solution, which can especially be an aqueous solution prepared from a high fructose corn syrup product. By rapidly heating the aqueous hexose sugar solution to the elevated temperatures involved as well as rapidly cooling the resultant product mixture, a limited per-pass conversion to HMF is obtained; correspondingly, however, the overall exposure of the HMF that is formed to acidic, elevated temperature conditions is also limited, so that little to no unwanted or unusable byproducts are produced requiring waste treatments. Separation and recovery of the products is simplified and levels of HMF and other hexose dehydration products known to inhibit ethanol production by fermentation are reduced in the residual sugars product, to an extent whereby the residual sugars product can be used directly for ethanol fermentation if desired.

In the latter application, certain substituted sulfonic acids are used for the acid catalyst, preferably in the context of the "limited per-pass conversion" process just summarized. These catalysts are sufficiently soluble in the aqueous sugar solution under dehydration or near dehydration conditions to effectively catalyze the conversion of the sugars to HMF, but in contrast to the mineral acids are readily recoverable afterwards—for example, through formation of insoluble salts and filtration, through adsorption/desorption, chromatographic methods or solvent extraction. The catalysts in this respect share the beneficial aspect of the solid acid catalysts that had been described previously, while offering a degree of stability and activity in the presence of water and at elevated temperatures that had been lacking in the known solid acid catalysts.

The subsequent oxidation of the HMF and/or of HMF derivatives (produced by such methods as described above) to FDCA can be accomplished according to a variety of known processes. For example, Partenheimer and Grushin established that diformylfuran and FDCA could be made from HMF by oxidation in the presence of dissolved oxygen at about 1000 psi, and a catalyst system containing Co(II), Mn(II), and a Br salt preferentially also including Zr (W. Partenhemier & V Grushin: *Adv. Synth. Catal.* (2001) 343, 102-111). HMF esters and/or HMF ethers can also be formed as a suitable feed for being oxidized to produce FDCA, as shown for example in EP 2050742 B1 to Grushin et al. (ester derivatives) and WO 2010/132740 to Sanborn (HMF esters and HMF ethers).

A further method, usable for the oxidation of both HMF and its oxidizable derivatives, is described in WO 2013/033058 to Zuo et al. for "Spray Oxidation Process for Producing 2,5-Furandicarboxylic Acid from Hydroxymethylfurfural", which application is incorporated herein by reference. In this method, an oxidation is carried out on a sprayable feed including a furanic substrate to be oxidized (which can be HMF or an HMF derivative) and a catalytically effective combination of cobalt, manganese, and bromide components for catalyzing the oxidation of the furanic substrate, wherein the feed is sprayed into a reactor vessel as a mist, an oxidant is supplied, the furanic substrate and the oxidant are reacted and the exothermic temperature rise due to the reaction is managed through a selection and control of the operating pressure within the reactor vessel. Beneficially, a crude dehydration product from the dehydration of fructose, glucose or both, including 5-hydroxymethylfurfural, can be directly oxidized by the process to produce 2,5-furandicarboxylic acid (FDCA) in surprising yields.

The production of the diesters of FDCA is also described in the published literature, and will be within the capabilities of those skilled in the art. For example, Sanderson et al., "Synthesis and Evaluation of Dialkyl Furan-2,5-Dicarboxylates as Plasticizers for PVC", Journal of Applied Polymer Science, vol. 53, pp 1785-1793 (1994) describes methods for the synthesis of di(2-ethylhexyl) di(2-octyl), dihexyl and dibutyl furan-2,5-dicarboxylates starting with furfural (rather than HMF) obtainable from plant residues. Furfural in this regard may be produced by the same acid-catalyzed sugars dehydration methods described above, but from five-carbon sugars such as xylose and arabinose rather than the six-carbon sugars giving rise to HMF.

In Sanderson's method, the furfural is oxidized first to furoic acid (analogously to the oxidation of HMF to FDCA described above) with oxygen and silver oxide as the catalyst in an aqueous alkaline solution, then the furoic acid is esterified to methyl furoate with methanol and an acid catalyst (Amberlyst® 15 resin). The methyl furoate was then chloromethylated by passing a stream of gaseous hydrochloric acid through a reaction mixture comprised of methyl furoate, paraformaldehyde and zinc chloride in chloroform. Oxidation of the methyl-5-chloromethylfuroate with nitric acid yielded furan-2,5-dicarboxylic acid, which was esterified with methanol in the presence of an acid catalyst to the dimethyl ester. The various listed FDCA diesters were then prepared by transesterification with the appropriate alcohol in the presence of solid potassium carbonate under phase-transfer conditions with no added solvent.

The two applications by Grass et al. propose to make the FDCA diesters by any of several methods. In one method, FDCA is esterified directly with Grass et al's mixtures of isomeric nonanols or decanols autocatalytically or catalytically. An entraining agent is preferably used to assist in removing the water of reaction and drive the equilibrium toward the formation of the esters. Suggested esterification catalysts include sulfuric acid, methanesulfonic acid, p-toluenesulfonic acid or a metal catalyst, such as powdered tin, tin (II) oxide, tin (III) oxalate, titanate esters and zirconium esters. In a variation of the method, a reactive FDCA dichloride derivative is first formed, and this reactive intermediate is then esterified. In a second method suggested as suitable by Grass et al., lower dialkyl esters (C1-C8) of FDCA are made, then undergo transesterification with the mixture of isomeric nonanols or decanols in the presence of an acid catalyst or a basic esterification catalyst such as an alcoholate (e.g., sodium methylate).

The present invention is further illustrated by the following examples:

EXAMPLE 1

Esterification of 10 g FDCA (or 2,5-FDA) with 2-methyl-1-propanol

White solid, 16.2 g, 95% yield

|  | M (g/mol) | Density | Mass or Volume | Mmol | equivalent |
|---|---|---|---|---|---|
| FDCA | 156.1 |  | 10.0 g | 64.0 | 1 |
| 2-methyl-1-propanol | 74.12 | 0.803 | 23.6 mL (+20 mL) | 256.2 | 4 |
| Methanesulfonic acid (MSA) | 96.11 | 1.481 | 0.1 mL |  | 2.5 mol % |

In a 100 mL round-bottom flask, under a positive pressure of nitrogen, and strong magnetic stirring, were introduced the substrate FDCA, 30 mL of 2-methyl-1-propanol and 0.1 mL of MSA. 20 mL of the alcohol were placed in the Dean-Stark trap and the white slurry was heated at 130° C. The FDCA used as a feed in this and subsequent examples was obtained by the oxidation of HMF in accordance with known methods, and was confirmed by $^1$H NMR as 99.9% pure.

After 24 h at 130° C., 1.3 mL of water was collected in the Dean-Stark trap (the theoretical volume being 2.3 mL). FDCA appears to be only slightly soluble in 2-methyl-1-propanol but after reaction, no more white solid was present and the clear crude solution was slightly brown.

During cooling down to room temperature a white solid crystalized in the flask. The solid was filtered over a Büchner funnel, washed with ethanol, and dried under vacuum to afford the product (16.2 g, 95% yield) as a solid. Analysis by NMR and by GC-MS confirmed the product as di(2-methylpropyl)furan-2,5-dicarboxylate.

EXAMPLE 2

Esterification of 10 g FDCA with 2-ethyl-1-hexanol

Pale yellow oil, 22.1 g, 91% yield

|  | M (g/mol) | Density | Mass or Volume | Mmol | equivalent |
|---|---|---|---|---|---|
| FDCA | 156.1 |  | 10.0 g | 64.0 | 1 |
| 2-ethyl-1-hexanol | 130.23 | 0.833 | 30.0 mL (+20 mL) | 192.1 | 3 |
| Methanesulfonic acid | 96.11 | 1.481 | 0.1 mL |  | 2.5 mol % |

In a 100 mL round-bottom flask, under a positive pressure of nitrogen, under strong magnetic stirring, were introduced the substrate FDCA, 30 mL of 2-ethyl-1-hexanol and 0.1 mL of MSA. 20 mL of the alcohol were placed in the Dean-Stark trap and the white slurry was heated at 160° C.

The boiling point of 2-ethyl-1-hexanol is 185° C. but the mixture started to boil (first foam, then boil) at 150° C. The reflux was not steady at the start but water condensed in the Dean-Stark trap relatively quickly. After 6 h at 160° C., the conversion reached 85% (analysed by $^1$H NMR) and was complete after 10 h (analysed by $^1$H NMR). In the Dean-Stark trap, 1.9 mL of water was collected (the theoretical volume being 2.3 mL). 2,5-FDA appears to be only slightly soluble in 2-ethyl-1-hexanol but after 10 h at 160° C., no more white solid was present and the clear crude solution was slightly brown. The solvent was removed under reduced pressure (high vacuum and heating) to afford a crude liquid with a light brown color.

The crude was purified by flash chromatography over silica gel (elution: ether/petroleum ether=1/9, $R_f$=0.5) and afforded the product (22.1 g, 91% yield) as a pale yellow oil. Analysis by NMR and by GC-MS confirmed the product as di(2-ethylhexyl)furan-2,5-dicarboxylate.

EXAMPLE 3

Esterification of 10 g FDCA with Isodecanol (Exxal 10® Isomeric Decanol Mixture Purchased from Exxon-Mobil Corp)

Pale yellow oil, 23.0 g, 82% yield

|  | M (g/mol) | Density | Mass or Volume | Mmol | equivalent |
|---|---|---|---|---|---|
| FDCA | 156.1 |  | 10.0 g | 64.0 | 1 |
| Exxal 10 ® | 158.28 | 0.84 | 36.2 mL | 192.2 | 3 |
| Methanesulfonic acid | 96.11 | 1.481 | 0.1 mL |  | 2.5 mol % |
| o-xylene |  |  | 35 mL (+20 mL) |  |  |

In a 100 mL round-bottom flask, under a positive pressure of nitrogen, under strong magnetic stirring, were introduced the substrate FDCA, 36.2 mL of Exxal 10®, 0.1 mL of MSA, and 35 mL of o-xylene (added for azeotropic water removal). 20 mL of solvent was placed in the Dean-Stark trap and the white slurry was heated at 160° C. for 10 h. (first a lot of foam formed then the mixture refluxed steadily). In the Dean-Stark trap, 1.6 mL of water was collected (the theoretical volume being 2.3 mL). The solvent and the excess of isodecanol were removed under reduced pressure (high vacuum and heating) to afford a crude liquid with a light brown color.

The crude was purified by flash chromatography over silica gel (elution: ether/petroleum ether=1/9, $R_f$=0.35) and afforded the product (23.0 g, 82% yield) as a pale yellow oil. Analysis by GC-MS confirmed the isolated product as di(isodecyl)furan-2,5-dicarboxylate.

EXAMPLE 4

The FDCA diesters prepared in Examples 1-3 were purified by column chromatography and then analyzed and compared for color and for intrinsic volatility to the corresponding phthalate esters, to the isomeric decanol mixture from Exxon-Mobil that had been used in Example 3, the epoxidized octyl stearate material (Lankroflex® ED-6, Akcros Chemicals) used below in the PVC compositions that were made and tested and to a commercial specialty plasticizer, Mesamoll II® alkylsulphonic acid phenyl esters general purpose plasticizer (Lanxess AG).

Intrinsic volatility was determined using thermal gravimetric analysis on a Perkin-Elmer 7 series thermal analysis system, either under a nitrogen atmosphere or air. Samples were heated from room temperature to 550 degrees Celsius at a heating rate of 10 degrees Celsius per minute. The average sample weight was about 20 mg. Gas flows were at 40 mL/min for the balance and 20 mL/min for the sample gas.

Color measurement was accomplished according to DIN-ISO 6271 (Pt—Co color) using a LICO® 100 colorimeter from Dr. Bruno Lange GmbH & Co. KG, using a 50 mm cuvette at room temperature. Calibration was performed using demineralized water. In view of Sanderson et al's report of discoloration of the 2-octyl-FDCA ester, a second set of color measurements was collected for the FDCA diesters from Examples 1-3 after 6 weeks' storage at room temperature.

The results are reported below in Table 1, as to the Pt—Co color:

TABLE 1

Color of prepared plasticisers, reference phthalates and plasticiser alcohols.

| Material | Appearance | Color: Hazen value (DIN-ISO 6271) After work-up/after 6 weeks @ RT |
|---|---|---|
| DIBF | Solid | — |
| DEHF | Fluid | 203/215 |
| DIDF | Fluid | 512/503 |
| DEHP | Fluid | 14 |
| DIDP | Fluid | 19 |
| 2-ethylhexanol | Fluid | 8 |
| Exxal-10 ® | Fluid | 7 |
| Mesamoll ® II (Bayer) | Fluid | <400 |
| Lankroflex ED-6 | Viscous | 300-400 |

From the data in Table 1, the reference phthalate plasticizers were water-white, while the FDCA diesters were slightly colored. Comparatively little additional discoloration was observed, however, upon storage for the FDCA diesters.

Figure 1:
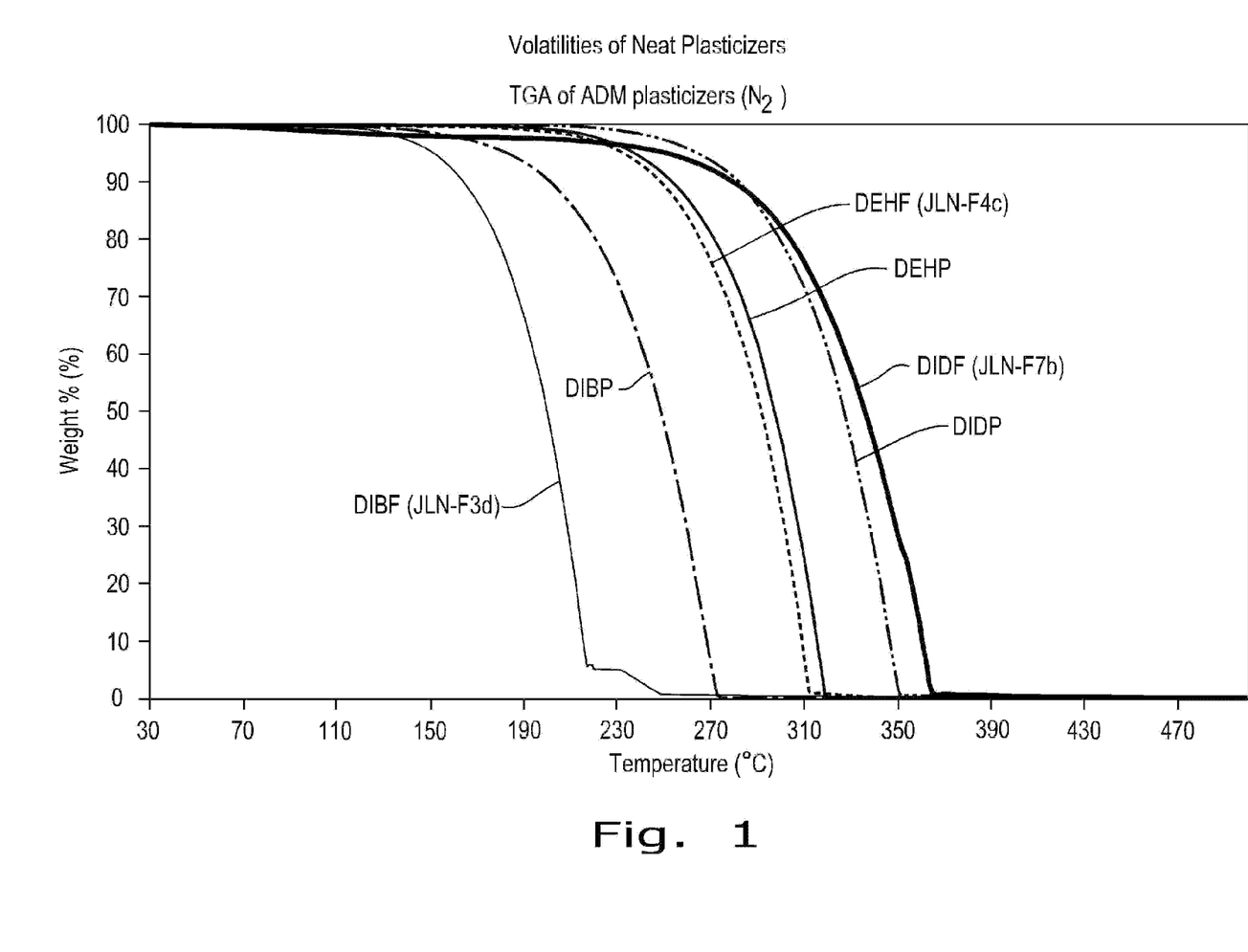
FIG. 1 shows the result of testing to compare the intrinsic volatilities of neat plasticizers between the FDCA diesters and comparable phthalate esters.

The intrinsic volatility/TGA results are found in FIG. 1, and show that DIBF is more volatile than the corresponding phthalate equivalent, while DEHF and DIDF have very comparable intrinsic volatilities to their phthalate equivalents.

EXAMPLE 5

Several PVC compositions were prepared from the FDCA diesters of Examples 1-3 and their phthalate ester counterparts. Initially, dry blends were prepared according to the following standard recipe:
PVC (100 phr)
Plasticizer (40.0 or 60.0 phr)
Lankroflex® ED-6 (3.00 phr)
Liquid Ca/Zn LZC-364 thermal stabilizer (Akcros Chemicals, 2.00 phr)
Stearic acid (Aldrich, 0.25 phr)

The dry blends were prepared by adding the other materials exclusive of the plasticizer to the PVC, then adding the plasticizer. After thorough manual mixing of the composition, the mixture was heated in an oven overnight at 60 degrees Celsius. After additional manual mixing, the compound was processed on a Collin Type 110P two roll mill preheated to 166 deg. C./168 deg. C. (front/rear) and with a slit-width of 0.4 mm. About 80 grams of a mixture was placed on the rolls and left for 30 seconds. The material was mixed for two and a half minutes by manual cutting and kneading. After leaving the material on the rolling rolls for another 30 seconds, the resultant sheets were taken off.

In the course of preparing the dry blends and milling the blends, it was observed that the DEHF and DIDF materials provided dry blends that were comparable to those prepared from their phthalate ester counterparts, whereas the DIBF did not provide a good dry blend and required additional heating and mixing. In the milling, similarly, the DEHF and DIDF blends processed well, with excellent gelation behavior, transparent flexible sheets and comparable flexibility to those made from the DEHP and DIDP blends. In contrast, the DIBF blends at both 40 and 60 phr gave incomplete gelation, and fuming was observed during the milling. Further, the sheets adhered to the rear roll, providing a low quality sheet the 40 phr loading and no usable sheet at the 60 phr loading.

After obtaining all of the milled sheets, strips (26×3 cm) were cut for static heat stability testing in a Mathis Thermotester LTE-T (Mathis AG), using an oven preheating time in excess of five minutes. The ventilation speed was set at 1250 rpm, and the oven temperature was set at 200 degrees Celsius. The residence time was 45 minutes, with a sample speed of 27 seconds and a step size of 2 mm. After trimming 3 cm from the head and tail of each strip, the final 20×3 cm strips are shown in FIG. 2. The PVC compositions including DEHF and DIDF plasticizers exhibited better heat stability at both 40 phr and 60 phr than the compositions with the corresponding phthalate esters. A careful examination of the 60 phr strips also showed that after discoloration starts the strips containing DEHF and DIDF are still mainly transparent, whereas the phthalate strips are opaque and show more significant HCl evolution and related foaming.

The remaining sheet material was then used for compression molding, in order to obtain test specimens for tensile testing and glass transition temperature determination via dynamic mechanical thermal analysis (DMTA). In particular, 1 mm thick compression molded press plates were made by preheating a press to 160 degrees Celsius. A mold (180×120×1 mm) was filed with approximately 28 grams of the sheet material from a given composition, and this was covered with a PET foil and with a steel disk. After heating for 4 minutes under 3 tons applied pressure, the pressure was increased to 20 tons for a further minute, followed by cooling to room temperature over ten minutes. The CIELAB system colors of the compression molded press plates were then measured according to DIN-6174 with a Spectro-Pen® LMG 161 pen-type colorimeter from Dr. Bruno Lange GmbH KG & Co, with a white sheet of paper as background. Test specimens were then cut per ISO 37, type 2 specifications for the tensile and DMTA testing, having a "dumb-bell shape", an overall length of 75.0 mm, a length of the narrow portion of 25.0 mm, a width of the narrow portion of 4.0 mm and a width at the ends of 12.5 mm.

The tensile measurements were carried out at 20 degrees Celsius on a Zwick Z010 tensile testing machine (Zwick Roell Group, Ulm, Germany) equipped with a 1 kN load cell and extensometers. After clamping the test specimens, the E-modulus was determined with a test speed of 1.0 mm/min, while the stress at 100% strain and the strain at break were determined at 500 mm/min in accordance with ISO-1184.

The DMTA measurements were performed using a Rheometrics RSA-2 solids analyzer (Rheometrics, Inc., Piscataway N.J.) equipped with a film geometry. A sample, approximately 25×4×1 mm in size) was fixed and tested in tensile mode with frequency 1.0 Hz at 0.1% strain. A temperature scan was performed from −40 degrees Celsius to 150 degrees Celsius, and the maximum tan δ was recorded as indicative (within a degree Celsius) of the glass transition temperature of the compositions.

The CIELAB color measurements, tensile and DMTA results for the compression molded press plates from the various PVC compositions—those plasticized using the FDCA diesters as well as using the corresponding phthalate ester plasticizers—are reported in Table 2 following:

TABLE 2

Data Obtained from Compression Molded Press Plates

| Plasticizer | Phr | CIELAB colors 2nd nr: data obtained after 14 d storage @ RT | | | Tensile testing data | | | DMTA |
|---|---|---|---|---|---|---|---|---|
| | | L* | a* | b* | E-modulus (MPa) | Strain Max. (MPa) | Stress Max (%) | Tan δ (° C.) |
| DEHP | 40 | 91.6/92.1 | −0.8/−0.1 | 1.7/0.7 | 19.1 [0.7] | 15.3 [3.8] | 110.2 [58.5] | 26 |
| DEHF | 40 | 91.6/92.5 | −1.0/−0.1 | 1.8/0.8 | 16.6 [0.5] | 17.3 [2.0] | 145.8 [43.2] | 24 |
| DEHP | 60 | 91.9/92.7 | −0.9/−0.1 | 1.2/0.1 | 6.3 [0.2] | 11.1 [3.4] | 155.0 [78.0] | 5 |
| DEHF | 60 | 91.7/92.2 | −0.9/−0.1 | 1.5/0.3 | 5.4 [0.8] | 11.8 [2.7] | 186.6 [60.2] | 5 |
| DIDP | 40 | 91.7/92.7 | −0.8/−0.1 | 1.8/0.7 | 49.5 [2.0] | 14.9 [2.2] | 69.6 [27.4] | 35 |
| DIDF | 40 | 91.2/92.5 | −0.9/−0.2 | 2.4/1.4 | 42.6 [1.6] | 17.1 [2.9] | 107.4 [51.9] | 34 |
| DIDP | 60 | 92.8/92.3 | −0.9/−0.1 | 1.3/0.5 | 8.9 [0.9] | 13.6 [2.0] | 175.5 [55.6] | 10 |
| DIDF | 60 | 91.2/92.5 | −0.9/−0.1 | 2.3/0.9 | 7.8 [0.8] | 12.8 [1.7] | 153.4 [33.9] | 12 |

What is claimed is:

1. In a process for making a plasticized unpigmented PVC film wherein neither of the a* or b* color values are more than 3 units removed from a value of 0, using a primary plasticizer possessing a Pt—Co color of more than 500.

2. The process of claim 1, wherein the primary plasticizer is biobased.

3. The process of claim 2, wherein the primary plasticizer includes one or more esters of furan-2,5-dicarboxylic acid.

4. The process of claim 3, wherein the primary plasticizer includes one or more of the esters of FDCA formed from the normal and iso C3 to C14 alcohols.

5. The process of claim 4, wherein the primary plasticizer includes one or more of the esters of FDCA formed from the normal and iso C5 to C11 alcohols.

6. The process of claim 5, wherein the primary plasticizer consists of an FDCA diester from isononyl alcohol, an FDCA diester from isodecyl alcohol or a combination of FDCA diesters from both isononyl alcohol and isodecyl alcohol.

7. In a process of making a plasticized unpigmented PVC film whose a* and b* color values are not more than 250 percent further removed from a value of 0, than the a* and b* color values of a reference plasticized unpigmented PVC film differing from the first film in composition and manner of manufacture substantially only in the primary plasticizer used therein, using a primary plasticizer in forming the first film that has a Pt—Co color in neat form that is at least 20 times greater than the Pt—Co color of the primary plasticizer used in the reference film in neat form.

8. In a process for making a plasticized pigmented PVC film wherein the a*, b* and L* color values of the film all do not vary by more than 400 percent from a selected reference color standard based on the same pigment, using a primary plasticizer having a Pt—Co color of more than 200.

9. The process of claim 8, wherein the a*, b* and L* color values of the film all do not vary by more than 200 percent from the selected reference color standard.

10. The process of claim 9, wherein the a*, b* and L* color values of the film all do not vary by more than 100 percent from the selected reference color standard.

11. The process of any one of claims 8-10, wherein the primary plasticizer is biobased.

12. The process of claim 11, wherein the primary plasticizer includes one or more esters of furan-2,5-dicarboxylic acid.

13. The process of claim 12, wherein the primary plasticizer includes one or more of the esters of FDCA formed from the normal and iso C3 to C14 alcohols.

14. The process of claim 13, wherein the primary plasticizer includes one or more of the esters of FDCA formed from the normal and iso C5 to C11 alcohols.

15. The process of claim 14, wherein the primary plasticizer consists of an FDCA diester from isononyl alcohol, an FDCA diester from isodecyl alcohol or a combination of FDCA diesters from both isononyl alcohol and isodecyl alcohol.

* * * * *